United States Patent
Chandross et al.

[11] 3,767,445
[45] Oct. 23, 1973

[54] EMBOSSING TECHNIQUES FOR PRODUCING INTEGRATED OPTICAL CIRCUITS

[75] Inventors: Edwin Arthur Chandross, Berkeley Heights; Walter John Tomlinson, III, Holmdel; Reinhard Ulrich, Matawan; Heinz Paul Weber, Middletown, all of N.J.

[73] Assignee: Bell Telephone Laboratories Incorporated, Murray Hill, N.J.

[22] Filed: Oct. 14, 1971

[21] Appl. No.: 189,101

[52] U.S. Cl............ 117/8, 117/93.31, 117/138.8 A, 117/161 UB
[51] Int. Cl............................................. B44c 1/22
[58] Field of Search .................. 117/8, 161 UB, 11, 117/138.8 A, 33.3, 93.31; 161/DIG. 3

[56] References Cited
UNITED STATES PATENTS

| | | | |
|---|---|---|---|
| 2,161,990 | 6/1939 | Asnes | 161/5 |
| 2,320,536 | 6/1943 | Pollack et al | 117/161 UB |
| 2,361,055 | 10/1944 | Pollack | 117/161 UB |
| 2,892,716 | 6/1959 | Martin | 117/138.8 A |
| 3,084,068 | 4/1963 | Munn | 117/161 UB |
| 3,278,322 | 10/1966 | Harkins et al. | 117/10 |
| 3,671,283 | 6/1972 | Crowley et al | 117/10 |

Primary Examiner—William D. Martin
Assistant Examiner—Theodore G. Davis
Attorney—W. L. Keefauver

[57] ABSTRACT

There is disclosed a technique for producing integrated optical waveguides or circuits in which a substrate is embossed by a die of the desired guide pattern and is then coated with a liquid that fills the grooves and has sufficient surface tension to yield a greater thickness in the grooves than over adjacent substrate material. The liquid may be a solution of a higher-index optical material, solidifying in the grooves during evaporation of the solvent. Alternatively, a liquid monomer of a polymerizable higher-index material may be used which is subsequently polymerized in the grooves. This embossing and filling technique is particularly economical when a large number of replicas of a given optical circuit are to be produced.

7 Claims, 8 Drawing Figures

PATENTED OCT 23 1973　　3,767,445

EMBOSSING TECHNIQUES FOR PRODUCING INTEGRATED OPTICAL CIRCUITS

BACKGROUND OF THE INVENTION

This invention relates to techniques for making optical waveguiding devices and related optical circuits.

Recently there has been considerable interest in thin film optical circuits and other dielectric waveguiding circuits. Several types of light guiding arrangements and input and output coupling arrangements have been investigated.

Nevertheless, most of the experiments to date have merely indicated the need for further research and development because each of the possible configurations has some drawback. For example, the thin film optical guides use thin films that are so wide that they guide the light in only one dimension. For many applications in integrated optical circuits, the light must also be guided in the transverse direction; and guides with cross sections of about three micrometers wide by about one micrometer thick are typically desired in order to obtain single-mode operation. As one example for the potential application of such integrated optical circuits, it is noted here that the losses occurring in long-distance optical fiber transmission lines require amplifying and pulse-shaping repeaters at intervals of typically every 10 km. Such repeaters are, therefore, required in large numbers and the problem reduces to one of simple and economical circuit fabrication, particularly the economical fabrication of replicas of a given circuit.

SUMMARY OF THE INVENTION

Our invention is based on our recognition that optical waveguide circuits can be produced by a replicating method the first step of which is reminiscent of, but different from, the mass production of phonograph records.

According to our invention, a transparent, plastic substrate is embossed by a die of the desired circuit pattern. In the second step of fabrication, the substrate is then coated with a higher-index transparent dielectric material that adheres to the substrate and fills the impressions, typically grooves, made by the die. This material is applied in liquid form so that it has sufficient surface tension to yield a greater thickness in the grooves than on adjacent substrate material. The region of greater thickness is then an optical guide or other part of an optical circuit.

In a preferred embodiment of our invention, the higher-index transparent dielectric material is chosen to be the liquid monomer of a polymerizable material which is then polymerized in the grooves, the polymerization being initiated either photochemically or thermally. Other types of initiation such as exposure to electrons or high energy radiation are also feasible. The term "plastic" in the foregoing summary is used in its generic sense, referring to the permanent, non-returning deformability of a first material by a die of a second harder material without fracture or any qualitative internal structural change. The deforming is done typically under high pressure and at elevated temperature.

BRIEF DESCRIPTION OF THE DRAWING

Further features and advantages of our invention will become apparent from the following detailed description, taken together with the drawing, in which.

DESCRIPTION OF THE ILLUSTRATIVE EMBODIMENT

Figure 1:
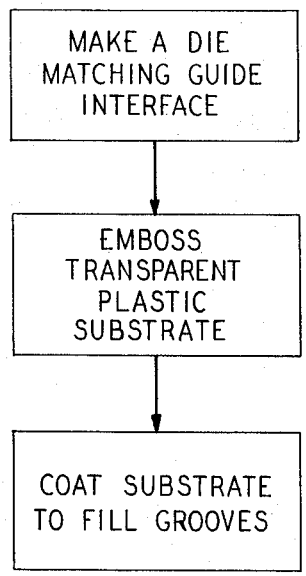
FIG. 1 is a block diagrammatic flow chart of the successive steps of the method of our invention.

The method described in the block diagrammatic flow chart of FIG. 1 is a new technique for fabricating integrated optical waveguide circuits; and this method has the potential for simple and inexpensive mass production. The sequence of steps will perhaps be better understood if certain aspects of the second step, the embossing step, are discussed in terms of our early experiments.

We have found that it is possible to emboss a plastic substrate, such as poly(methylmethacrylate), PMMA, to produce a pattern of impressions, typically grooves. These grooves then form part of the guiding interfaces for the optical waveguide components that are subsequently formed by filling the grooves. It is this indented or grooved surface of the embossed substrate which we refer to hereafter as the "guide interface."

The plastic substrate can be any material that can be deformed without qualitative internal structural change or fracture by a suitably hard die. The material must be sufficiently transparent and homogeneous for the intended purpose, and is preferably optically isotropic.

Obviously, then, the first step in the fabrication of an optical circuit is to make a die having a surface matching the desired guide interface, for example, matching the groove surfaces referred to above. As an illustration, this step can be implemented by a structure of the type shown in FIGS. 2A or 3A. Specifically, a glass plate 11 has a quartz fiber 13 typically of diameter B = 5 micrometers cemented to it by means of an epoxy compound 12. While the fiber 13 is shown in cross section, it should be understood that it extends backward along the line of sight and is cemented to the glass plate throughout its length. It can also be bent or curved within a surface parallel to the surface of the glass plate if it is desired to make a curved guiding structure in the substrate. Moreover, it is not necessary that the fiber has a round cross section. Elliptical, triangular or rectangular cross sections are equally acceptable from an optical point of view, although the embossing will work more accurately with the smoother profiles.

Dies for the embossing step could also be produced by optically writing the original circuit pattern in a film of positive working photoresist, which is then used as a mold in forming the die pattern in metal. This technique is analogous to that which has been demonstrated for the production of phase holograms in vinyl tape, as described by R. Bartolini et al. in their article in Applied Optics, Vol. 9, page 2283 (1970). Alternatively, the die could be made as suggested in the first three steps of FIG. 4, described below.

Figure 2A:
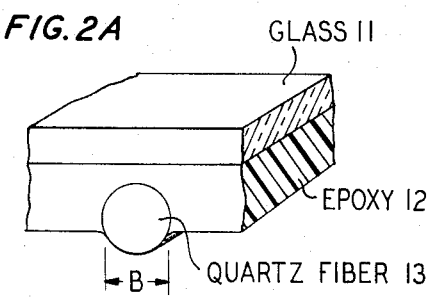
FIGS. 2A through 2C show structure that are related to the performance of the steps of the flow chart.
Figure 3A:
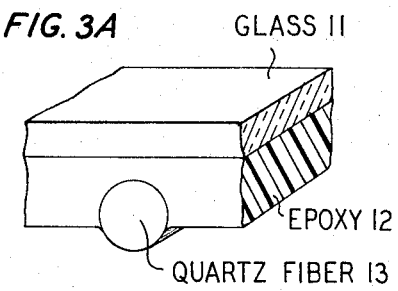
FIGS. 3A through 3C show structures like those of FIGS. 2A through 2C except for a materials modification yielding a modified final product.
Figure 2B:
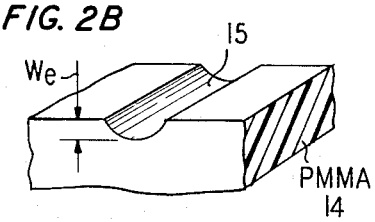
Figure 3B:
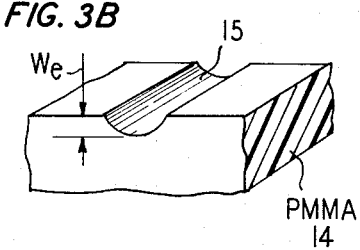

The second step of the fabrication sequence, FIG. 1, the embossing step, can be implemented by preparing a substrate 14 to have a top surface essentially parallel to the original bottom surface of glass plate 11. The substrate 14 is illustratively a sheet of poly(methylmethacrylate), a well-known plastic material having a refractive index of 1.49. The die is positioned with plate 11 parallel to substrate 14; and quartz fiber 13 is then pressed at a temperature of typically 100 degrees centigrade against substrate 14 with a pressure sufficient to form the groove 15 shown in cross section but which extends back along the line of sight. Groove 15 can have any bends or curves initially provided in the configuration of fiber 13. The die and substrate are allowed to cool down while still under pressure, and then they are separated. The resulting groove 15 is the guide interface. Its depth, $W_e$ in FIGS. 2B and 3B, is typically 0.5 to 5 micrometers.

To form an optical guide in the groove 15, the last step of he sequence of FIG. 1, the filling, is carried out. This step is equally as important to our fabrication technique as is the embossing step. Ideally, to give the strongest light-guiding effect, i.e., to reduce loss of light in curves of the guide, only the groove or grooves should be filled; and there should no film on the areas of the substrate directly adjacent to the groove. In practice, however, a very thin continuous film of the higher-index material is tolerable in these areas, provided its thickness $W_f$ (see FIG. 2C) is below the cutoff thickness for the lowest order guided mode in that film. Typically, $W_f < 0.2$ micrometer is required. The refractive index of the solidifed filling material must be higher than that of the substrate, typically by one percent. Furthermore, the filling material should have low optical losses. Obviously, to be compatible with mass production techniques, the high-index filling material must be deposited over the entire surface of the substrate 14. To attempt to deposit it in a limited region only would make the cost of production unreasonably high. Therefore, it is apparent that, for this step, a liquid high-index material is required which should be able to "wet," or adhere, to the surface of substrate 14. Yet, it must have a sufficiently high surface tension to form a smooth surface over the groove 15, yielding a greater thickness $W_g$ of the high-index material in the groove than the thickness $W_f$ on the surrounding surface of substrate 14.

For the implementation of the filling step we distinguish between two alternative methods. In the first method, the filling material is a liquid solution of a high-index optical material. The liquid film applied to the substrate solidifies upon evaporation of the solvent. Because the solid content of suitable solutions is low, typically not more than 20 percent, the solidification is accompanied by a very considerable volume shrinkage. This results in filled grooves whose top surface is indented, as in FIG. 2C, although the indentation is shallower than the groove 15. Therefore, the solution-deposited polymer film 16 is thicker in the embossed groove between surfaces 15 and 17 than at any other point over the substrate material 14. Since the index of refraction of material 16 is higher than the index of refraction of substrate 14, light guiding can occur in the region between surfaces 15 and 17 along the groove.

Figure 3C:
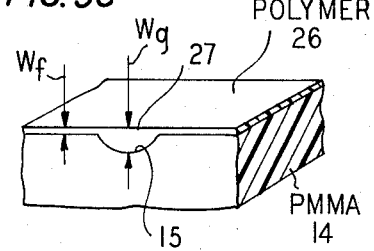

The other possible implementation of the filling step is to use an undiluted, liquid monomer of a polymerizable material of higher refractive index. Because the polymerization occurs with little shrinkage, the solid film resulting from this filling technique has an essentially flat top surface 26, as shown in FIG. 3C. Therefore, if the liquid monomer is allowed to evaporate for some time before the polymerization to produce a film of the desired thickness $W_g$, guides with much larger ratio $W_g/W_f$, i.e., with stronger guiding, can be produced by this alternative technique.

Below, we will discuss both filling methods in more detail. The technique of depositing light-guiding films from solution has been studied recently, as disclosed in the copending patent application of two of us, R. Ulrich and H. P. Weber, Ser. No. 131,296, filed Apr. 5, 1971, and now U.S. Pat. No. 3,725,809. On glass substrates some of the materials which they investigated were found to form films with very low optical losses (0.3 dB/cm). We have shown that deposition from a solution can also be used for filling embossed grooves. Solution-deposited films are typically applied in the form of about a 10 percent solution which then shrinks to the desired thickness as the solvent evaporates. The thickness of the final film is approximately proportional to the initial thickness of the applied liquid film. On an embossed substrate this initial film will be thicker in the grooves than in the unembossed areas; thus, the final film will also be thicker in the grooves. However, because of the large shrinkage (about 90 percent) during solvent evaporation, the difference between the thicknesses of the final film in the embossed and unembossed regions may not be as large as desirable. Careful control of the initial liquid film thickness is therefore necessary in this technique. In using solution-deposited films, the solven used to deposit the film should be carefully selected to avoid its attacking the substrate, either distorting or dissolving the embossed pattern, or producing a rough interface between film and substrate.

The alternate technique for filling the grooves, which we feel offers many advantages, is to lay down a thin film of an undiluted liquid monomer (e.g., cyclohexyl methacrylate) and then to photoinitiate polymerization of the film. In this technique, the film thickness can be adjusted by controlled evaporation of a part of the iquid film before polymerization is initiated. The total shrinkage during polymerization depends on the specific monomer, but it is typically only about 10 percent; thus it should be possible to obtain relatively larger thickness differences between the film in the embossed grooves and that in the unembossed areas. With this filling technique the thickness of the initial liquid film is much less critical than with solution deposition. Since we start with a pure material (except for a few percent of a photosensitive initiator) there is also no problem of solvent effects on the substrate, although, of course, the liquid monomer must be compatible with the substrate.

A wide variety of acrylic esters may be used as filling material. By choosing appropriate monomers or combinations of them, it is possible to adjust the refractive index of the film over a considerable range. Other monomers such as derivatives of styrene could also be used in an analogous manner. Furthermore, one could fill the grooves with various kinds of epoxy resins. To avoid the use of a diluent, the epoxides should be of relatively low molecular weight, and consequently low viscosity, and should be applied at a temperature that causes them to flow into the grooves.

It is also possible, if desired, to dope the groove-filling material or the substrate with a suitable dye of the type used for dye lasers in order to provide, with suitable optical pumping, gain for the light guided in the waveguide.

For our initial experiments on the preparation of embossed guides we made dies by cementing 5 micrometer diameter glass fibers 13 to glass slides 11. Specifically, a microscopic slide 11 was coated with a thin (about 3 micrometer thick) layer of epoxy cement (CIBA Araldite components 509 and 591); glass fibers were laid on the cement, and the epoxy was then cured for about 2 hours at 100 degrees centigrade. FIGS. 2A and 3A show the approximate cross section of the resulting die. For embossing, the die was brought in contact with substrate 14 of PMMA (commercial Plexiglas), with a pressure of about 5 pounds per square inch. Then it was heated to about 100 degrees centigrade. Upon cooling, the die separated from the plastic; the fiber remained intact and cemented to the die. An approprimate cross section of the resulting groove in the plastic substrate is shown in FIGS. 2B and 3B. The grooves were about 3 micrometers wide by about 1 micrometer deep, just about ideal for optical waveguides. Using this technique, we have been able to make many impressions from the same die. The embossed grooves have quite smooth walls, and we feel that carefully controlled annealing could make then still smoother.

Figure 2C:
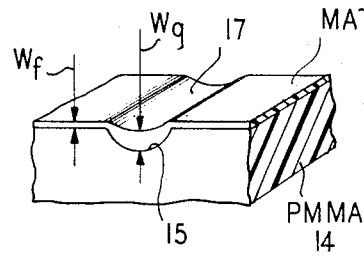

We demonstrated the filling of the grooves by solution deposition using the same epoxy as was used to glue the quartz fibers to the die. A mixture of CIBA Araldite components 509 and 951, diluted with methyl ethyl ketone and ethanol, was applied to the substrate. The film was dried in air for about 1 hour and then cured for about 2 hours at 100 degrees centigrade. A guide 27 curved in the plane parallel to the top surface of substrate 14 was formed between surfaces 15 and 17, as shown in FIG. 2C. Light of 0.633 micrometer wavelength was coupled into the guide using a prism-film coupler of known type, as in U.S. Pat. No. 3,584,230, issued June 8, 1971, and the light scattered from the guided beam was observed and photographed. The intrinsic loss of the guide was estimated to be about 7 dB/cm. We expect that by perfection of our technique this loss can be greatly reduced.

We have also demonstrated the filling of grooves by photopolymerization of a liquid monomer film. A thin film of cyclohexyl methacrylate, containing about 2 percent benzoin methyl ether as a photosensitive initiator, was applied to an embossed PMMA substrate. Excess liquid was allowed to evaporate for about forty minutes; and then the slide was exposed for about ten minutes to the light of a one kilowatt Hg-Xe arc lamp source with f/1.5 quartz optics and a water filter. During evaporation and exposure, the slide was maintained in a dry nitorgen atmosphere to eliminate oxygen, which would inhibit polymerization. The guide 27 of FIG. 3C was formed. Light of 0.633 micrometer wavelength was coupled into the guide 27 by a prism-film coupler, and the guiding action was confirmed, as was done for the guide made by solution deposition. The poly(cyclohexyl methacrylate) film 26 has a refractive index of 1.505, exceeding the index of the PMMA substrate ($n = 1.490$) by about one percent.

It should be noted that the dies and guiding structures of FIGS. 2A–2C and 3A–3C are very simple for purposes of illustration only. The die and the resulting guiding structures can have any desired degree of complexity.

Figure 4:
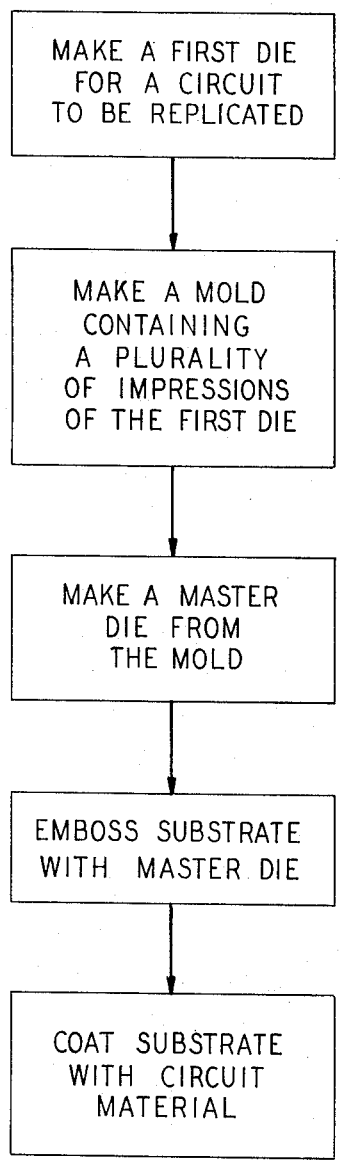
FIG. 4 is a modified block diagrammatic flow chart of the successive steps of a specific method according to our invention.

Moreover, to speed mass production of some circuits, side-by-side replicas of the same circuit, in columns and rows, can be built into the same die, as illustrated in the modified flow diagram of FIG. 4.

In FIG. 4, the first three steps outline the making of a master die. In the first step, like the first step of FIG. 1, a first die is made with a surface pattern at least in part matching the desired guiding interfaces for a single optical circuit. Next, a mold, which can be similar to substrates 14 of FIGS. 2B and 3B, is embossed in laterally offset positions in columns and rows by repeated impressions by that first die.

Third, the master die of a suitably hard material is made in the mold. The material of the master die could be, for example, any one of several thermo-setting resins; or it could be a metal, such as nickel or chromium.

The master die is then used to emboss the ultimate substrate 14 in which the ducplicate circuits are subsequently made by coating with material 16 or 26. The completed assembly may then be cut apart in a regular pattern to separate the individual circuits, if desired. The master die may be used repeatedly.

Of course, the method of FIG. 4 could be modified to emboss the mold for the master die with many different, interconnected circuit patterns, some of which may be repeated. This alternative is desirable for large scale circuit integration.

We claim:

1. A method of making dielectric waveguiding devices, comprising the steps of making a die having a surface shape at least a portion of which matches that of a guiding dielectric interface in the desired waveguiding devices, embossing the surface of a substantially optically transparent plastic substrate of a first index of refraction with said die to produce in said substrate surface an impression in the pattern of said interface, forming said interface by coating said substrate surface with a liquid material capable of flowing to fill the impression in said surface and capable of solidification into an optically transparent film in response to applied energy, and applying energy to said material to cause solidification of said material into an optically transparent dielectric film of a second index of refraction higher than said first index, said film forming said interface with said substrate surface and having a thickness over said impression capable of guiding a beam of optical radiation.

2. A method according to claim 1 in which the coating step comprises depositing on the substrate an optically transparent solid material in a liquid solution, and in which the energy supplying step comprises supplying heat to the solution to evaporate the solvent therefrom to leave said optically transparent dielectric film in the impression of said substrate surface.

3. A method according to claim 1 in which the coating step comprises depositing on the substrate a film of a liquid monomer, and in which the energy-applying step comprises initiating polymerization of said film to form said optically transparent dielectric film.

4. A method according to claim 1 in which the coating step comprises depositing on the substrate a film of a liquid monomer and, evaporating a portion of the liquid until the desired thickness of said film is produced, and in which the energy applying step comprises initiating polymerization of said film to form said optically transparent dielectric film.

5. A method according to claim 1 in which the coating step comprises depositing on the substrate a film of cyclohexyl methacrylate containing benzoic methyl ether as a photosensitive initiator and, evaporating a portion of the liquid until the desired thickness of said film is produced, and in which said energy applying step comprises exposing the film in a dry nitrogen atmosphere with an ultraviolet lamp to form a polymerized film as said optically transparent dielectric film.

6. A method according to claim 1 in which the coating step comprises supplying the liquid material to the substrate surface as a solution, said solution having a viscosity and surface tension selected for forming a relatively smooth exterior surface as compared to the embossed surface, and the energy applying step comprises supplying heat to the solution by maintaining the coated substrate at a temperature that causes evaporation of the solvent.

7. A method according to claim 1 in which the coating step comprises supplying the liquid material to the substrate surface as a liquid monomer including a polymerization initiator, said liquid monomer having a viscosity and surface tension selected for forming a relatively smooth exterior surface as compared to the embossed surface, and the energy applying step comprises applying to said monomer energy of the type to which the initiator responds by initiating polymerization.

* * * * *